United States Patent
Wang

(10) Patent No.: US 9,010,789 B1
(45) Date of Patent: Apr. 21, 2015

(54) HEAD PARTS ASSEMBLY FOR A BICYCLE

(71) Applicant: Neco Technology Industry Co., Ltd., Taichung (TW)

(72) Inventor: Yu-Hsin Wang, Taichung (TW)

(73) Assignee: Neco Technology Industry Co., Ltd., Taichung (TW)

( * ) Notice: Subject to any disclaimer, the term of this patent is extended or adjusted under 35 U.S.C. 154(b) by 0 days.

(21) Appl. No.: 14/152,528

(22) Filed: Jan. 10, 2014

(51) Int. Cl.
B62K 21/06 (2006.01)
F16C 1/10 (2006.01)

(52) U.S. Cl.
CPC .................. *F16C 1/103* (2013.01); *B62K 21/06* (2013.01)

(58) Field of Classification Search
USPC ................. 280/270, 276, 279, 280; 74/502.6, 74/502.4; 188/24.22, 24.21; 403/367
See application file for complete search history.

(56) References Cited

U.S. PATENT DOCUMENTS

| | | | |
|---|---|---|---|
| 5,765,446 A * | 6/1998 | Patterson et al. | 74/502.4 |
| 5,775,709 A * | 7/1998 | Chen | 280/279 |
| 6,220,398 B1 * | 4/2001 | Wu | 188/24.11 |
| 6,983,949 B2 * | 1/2006 | Ueno et al. | 280/279 |
| 7,866,892 B2 * | 1/2011 | Hsu | 384/510 |
| 2004/0188976 A1 * | 9/2004 | Schmider | 280/279 |
| 2007/0108723 A1 * | 5/2007 | Fukui | 280/276 |
| 2013/0154234 A1 * | 6/2013 | Shadwell | 280/279 |

* cited by examiner

Primary Examiner — Anne Marie Boehler
Assistant Examiner — Marlon Arce
(74) Attorney, Agent, or Firm — Patent Office of Bang Shia

(57) ABSTRACT

A head parts assembly for a bicycle includes two bowls, a plurality of inserting members, two bead nests, and two end caps. The two bowls each are a circular structure and include a pipe-inserting hole, and a plurality of cable-inserting holes around the pipe-inserting hole. Each of the bowls further includes a receiving cavity in communication with the pipe-inserting holes, and the two bowls are disposed at two ends of the front frame pipe. The inserting members each are a hollow tubular structure with a cable hole for insertion of cables of the bicycle, and are screwed in the cable-inserting holes. The bead nests are rotatably disposed in the receiving cavities and abutted against the close ends, respectively. The two end caps are disposed in the open ends of the receiving cavities, and capable of rotating by abutting against the balls of the bead nests.

8 Claims, 8 Drawing Sheets

HEAD PARTS ASSEMBLY FOR A BICYCLE

BACKGROUND OF THE INVENTION

1. Field of the Invention

The present invention relates to a part of a bicycle, and more particularly to a head parts assembly for the bicycle.

2. Description of the Prior Art

A bicycle is usually provided with a cable mounting seat on the frame of the bicycle for fixing the brake cable or the shift cable directly along the frame of the bicycle. However, this arrangement of cable would affect the aesthetic appearance of the bicycle, and the brake and shift cables are exposed directly to sunlight, and therefore the service life the brake and shift cables would adversely affected.

To overcome the above disadvantages, another cable arrangement was developed as shown in FIG. 1, wherein the bicycle frame 10 is formed with an insertion hole 11, so that the brake cable 20A and the shift cable 20B can be hidden in the insertion hole 11. However, forming an insertion hole 11 in the frame 10 would not only affect the aesthetic appearance of the bicycle but also weaken the structural strength of the bicycle frame.

The present invention has arisen to mitigate and/or obviate the afore-described disadvantages.

SUMMARY OF THE INVENTION

The primary objective of the present invention is to provide a head parts assembly for a bicycle, wherein the distribution of the cables of the bicycle won't affect the aesthetic appearance and structure of the bicycle.

To achieve the above objective, a head parts assembly for a bicycle is disposed on a front frame pipe, and comprises: two bowls, a plurality of inserting members, two bead nests, and two end caps.

The two bowls each are a circular structure and include a pipe-inserting hole, and a plurality of cable-inserting holes around the pipe-inserting hole, each of the bowls further includes a receiving cavity in communication with the pipe-inserting holes, and each of the receiving cavities includes an open end and a close end, and the two bowls are disposed at two ends of the front frame pipe.

The plurality of inserting members each are a hollow tubular structure with a cable hole for insertion of cables of the bicycle, and the inserting members are screwed in the cable-inserting holes.

The two bead nests each are an annular structure rotatably disposed in the receiving cavities of the bowls and abutted against the close ends, respectively, and each of the bead nests is provided with a plurality of balls.

The two end caps are an annular structure disposed in the open ends of the receiving cavities, and capable of rotating by abutting against the balls of the bead nests.

DETAILED DESCRIPTION OF THE PREFERRED EMBODIMENTS

Figure 1:
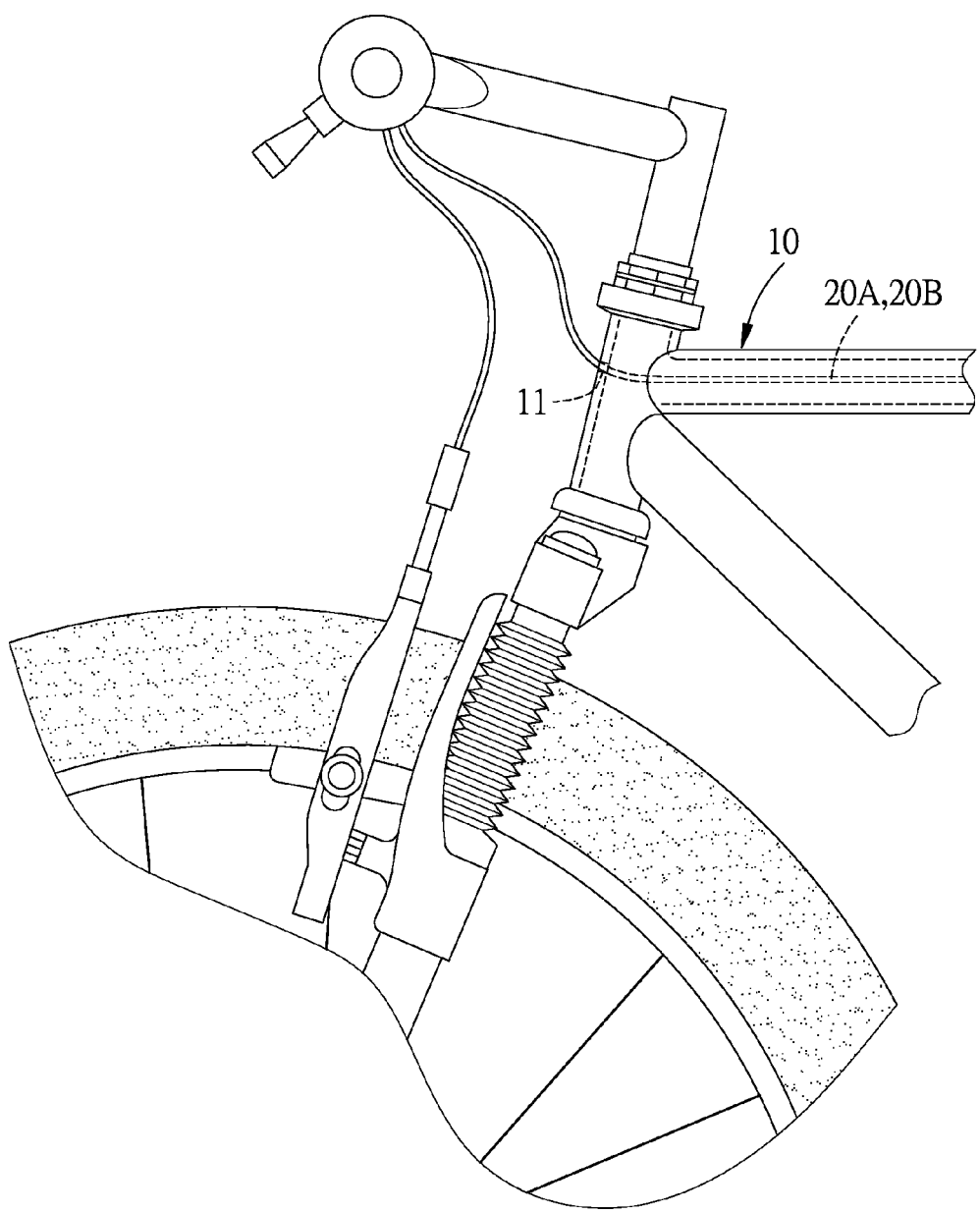
FIG. 1 shows that the bicycle cables are arranged in a conventional manner.
Figure 2:
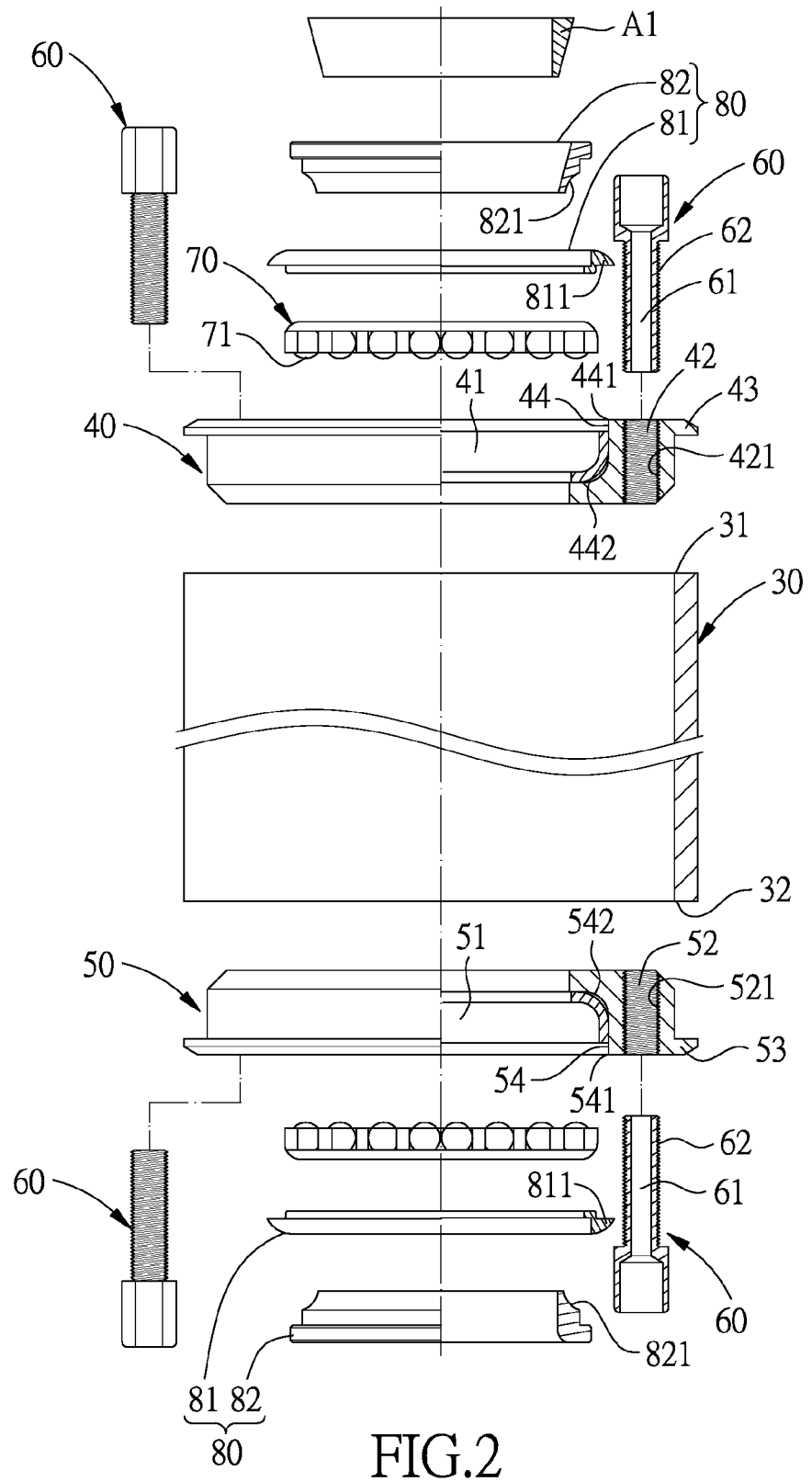
FIG. 2 is an exploded view of a head parts assembly for a bicycle in accordance with a first preferred embodiment of the present invention.
Figure 3:
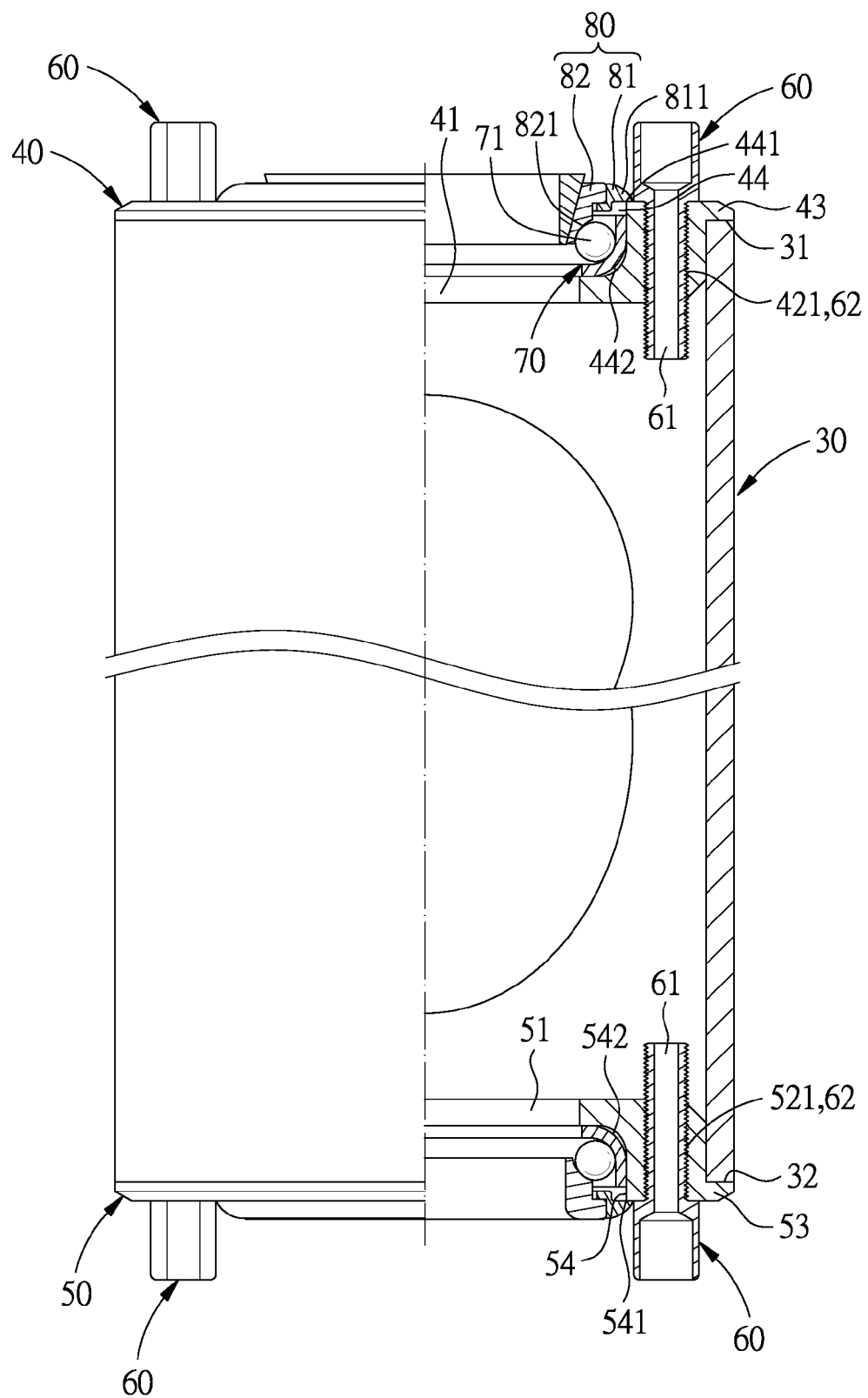
FIG. 3 is an assembly view of the head parts assembly for a bicycle in accordance with the first preferred embodiment of the present invention.

The present invention will be clearer from the following description when viewed together with the accompanying drawings, which show, for purpose of illustrations only, the preferred embodiment in accordance with the present invention.

Referring to FIGS. 2-5, a head parts assembly for a bicycle in accordance with a first preferred embodiment of the present invention is disposed on a front frame pipe 30 which includes an upper connecting end 31 and a lower connecting end 32, and the head parts assembly comprises: two bowls, a plurality of inserting members 60, two bead nests 70, and two end caps 80.

The two bowls are an upper bowl 40 and a lower bowl 50, each are a circular structure and includes a pipe-inserting hole 41, 51, and around the pipe-inserting hole 41, 51 are formed a plurality of cable-inserting holes 42, 52. The cable-inserting holes can also be formed only on one of the two bowls. Each of the pipe-inserting hole 41, 51 includes an inserting portion 421, 521 which is an inner thread. The upper and lower bowls 40, 50 each are provided at one end thereof with an abutting flange 43, 53, and a receiving cavity 44, 54 formed in the abutting flange 43, 53. The receiving cavities 44, 54 are in communication with the pipe-inserting holes 41, 51, respectively, and each include an open end 441, 541 and a close end 442, 542. The two bowls are disposed at two ends of the front frame pipe 30, and the abutting flanges 43, 53 are abutted against the front frame pipe 30. In this embodiment, the upper bowl 40 is disposed at the upper connecting end 31, and the lower bowl 50 is disposed at the lower connecting end 32.

The inserting members 60 each are a hollow tubular structure with a cable hole 61 and have a connecting portion 62 formed at one end thereof. In this embodiment, the connecting portion 62 is an outer thread for engaging with the inserting portion 421, 521. The inserting members 60 are screwed in the cable-inserting holes 42, 52. The cable hole 61 is sized to allow for insertion of cables of the bicycle.

The two bead nests 70 each are an annular structure provided with a plurality of balls 71, and are rotatably disposed in the receiving cavities 44, 54 of the upper and lower bowls 40, 50 and abutted against the close ends 442, 542, respectively.

The two end caps 80 each include a dustproof member 81 and an end cover 82. The dustproof members 81 are an annular structure disposed in the open ends 441, 541 of the receiving cavities 44, 54 and each have an abutting edge 811 abutted against the abutting flanges 43, 53. The end covers 82 are also an annular structure disposed in the dustproof members 81, and have an arc-shaped edge 821 abutted against the balls 71 of the bead nests 70, so that the end covers 82 can smoothly rotate by abutting against the balls 71 of the bead nests 70.

Figure 4A:
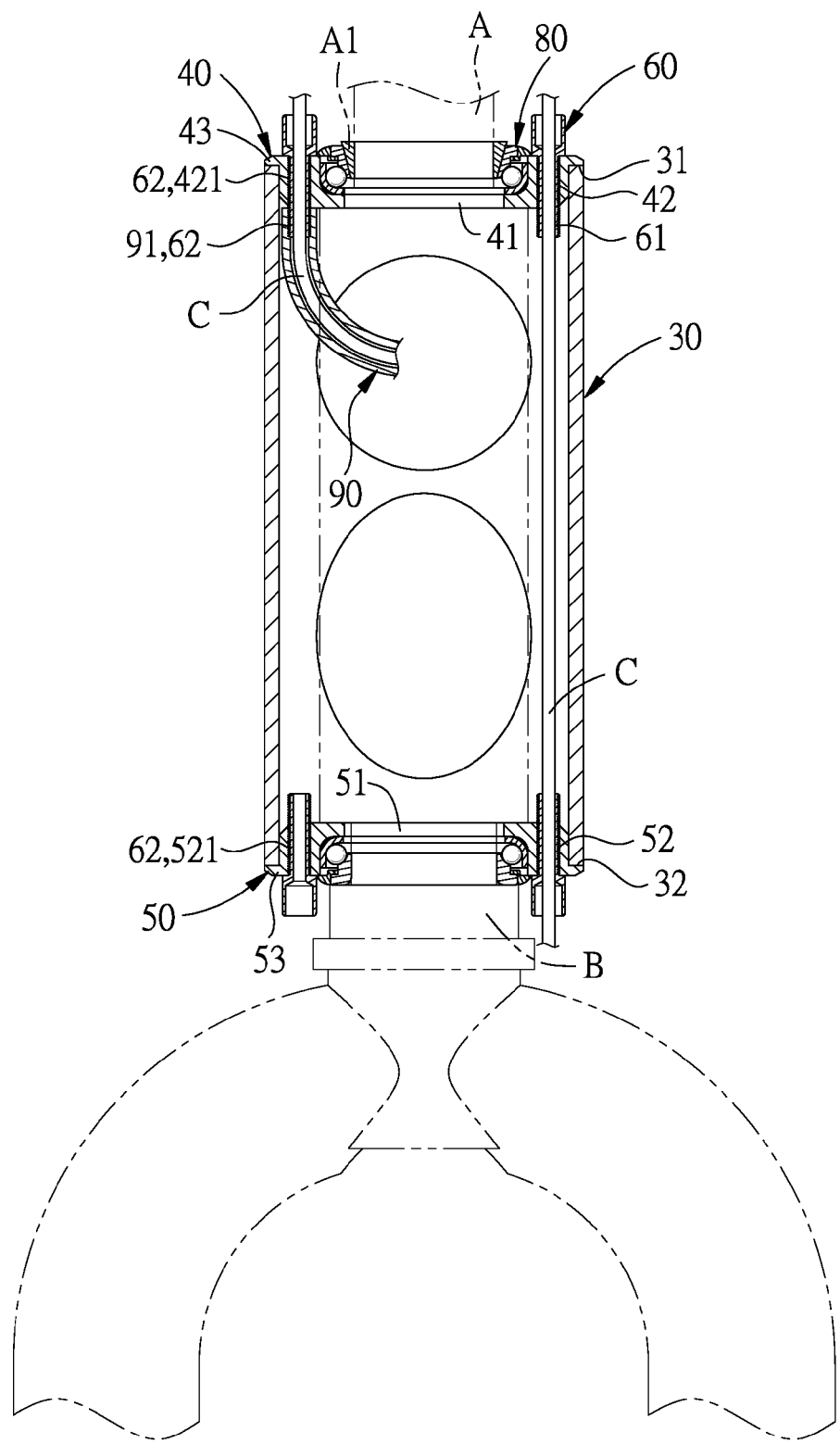
FIG. 4A is a front view of the head parts assembly for a bicycle in accordance with the first preferred embodiment of the present invention.
Figure 4B:
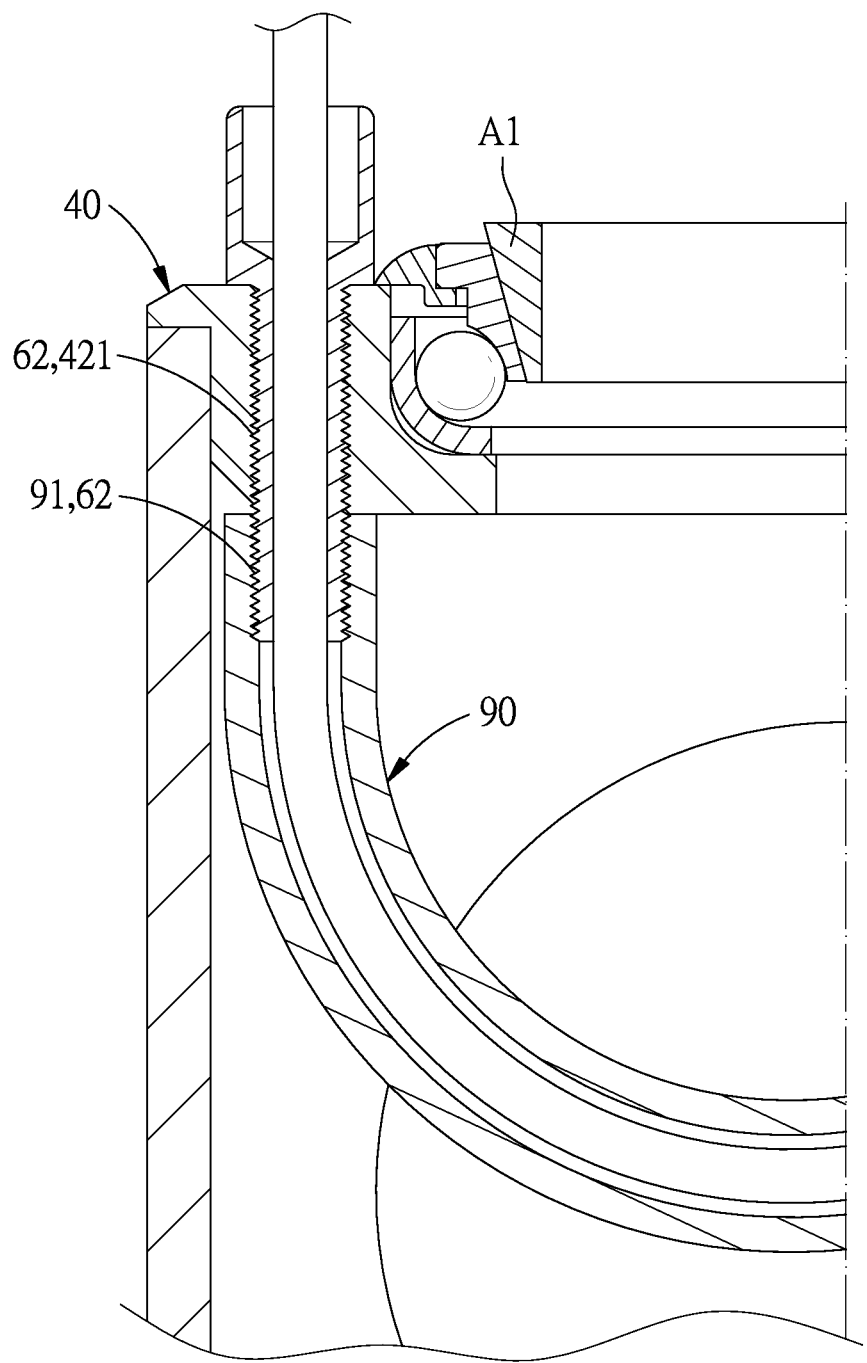
FIG. 4B is an enlarged view of a part of FIG. 4A.
Figure 5:
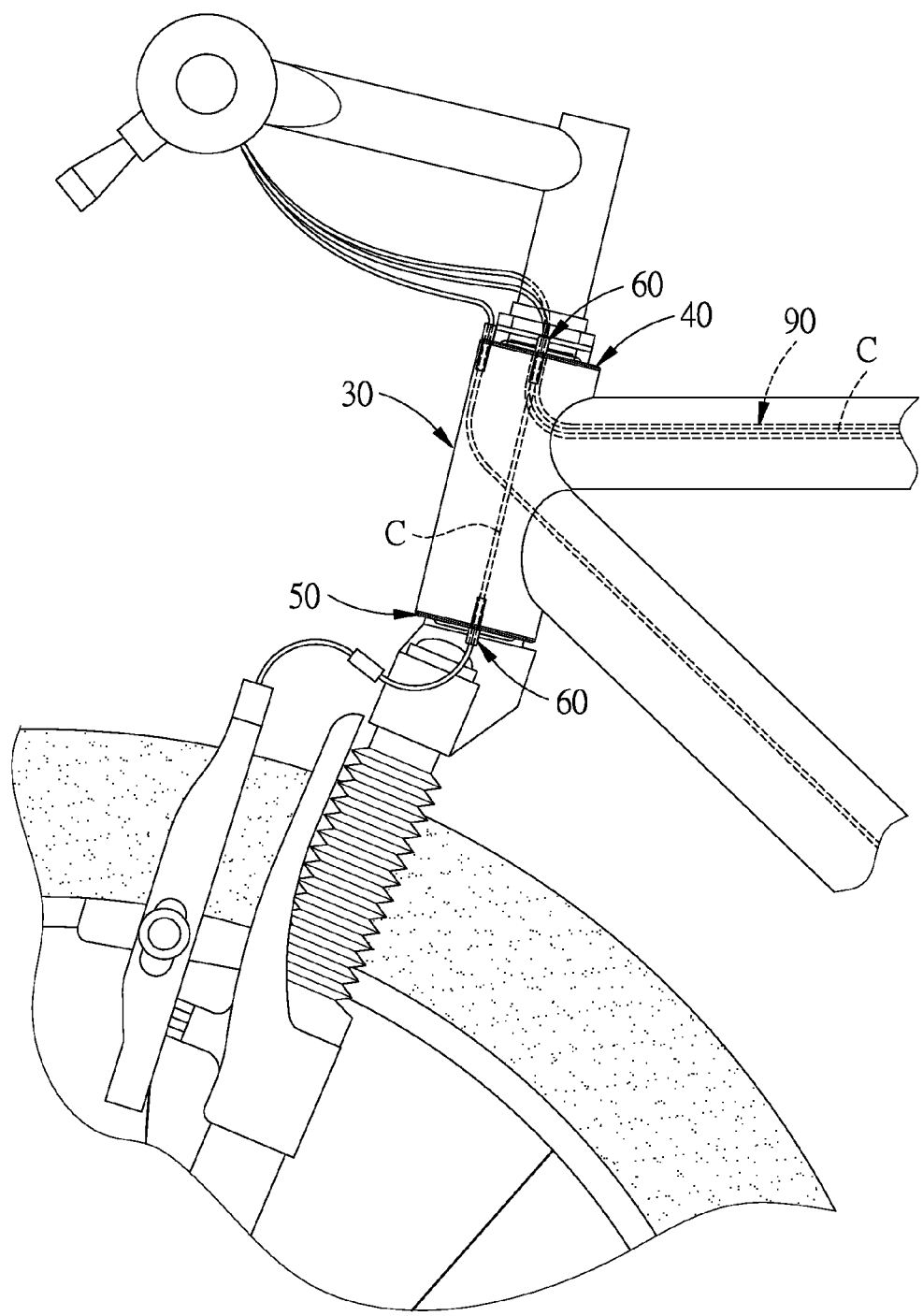
FIG. 5 is a side view of the head parts assembly for a bicycle in accordance with the first preferred embodiment of the present invention.

As shown in FIGS. 4A-4B, the upper and lower bowls 40, 50 are each assembled with one of the end caps 80 and then mounted at the upper and lower connecting ends 31, 32 of the front frame pipe 30. The inserting members 60 are fixed in the cable-inserting holes 42, 52. The handlebar A of the bicycle is fixed to the end cap 80 located at the upper bowl 40 by a plastic slanting pipe A1 and then inserted in the pipe-inserting hole 41 of the upper bowl 40. The front fork B of the bicycle is assembled to the end cap 80 located at the lower bowl 50, and then inserted in the pipe-inserting hole 51 of the lower bowl 50, so that the front fork B is capable of rotating with respect to the front frame pipe 30 via the end caps 80.

The cables C of the bicycle, such as brake cable or shift cable, can be inserted into the front frame pipe 30 through the inserting members 60. The cables C of the front wheel can be directly connected to the front brake by running through the inserting members 60 at the lower bowl 50, and the cables C of the rear wheel can be inserted and hidden in the upper or lower frame pipe which is in communication with the front frame pipe, so that the cables C can be prevented from solar radiation, and therefore would have a longer life. Furthermore, the cable holes 61 of the inserting members 60 are sized based on the size of the cables of the bicycle, which provides a better positioning and waterproof effect.

With the arrangement of the cable-inserting holes 42, 52 of the upper and lower bowls 40, 50, the cables of the bicycles can be distributed without breaking the integrity of the front frame pipe 30 (without forming inserting hole in the front frame pipe), so that neither the aesthetic appearance nor the structural strength of the bicycle frame would be affected.

To prevent the cables C from swaying while moving in the front frame pipe 30, a cable-guiding pipe 90 with an assembling portion 91 can be disposed in the front frame pipe 30 and connected to the cable-inserting holes 42, 52. The assembling portion 91 in this embodiment is an inner thread. The inserting members 60 can be inserted through the cable-inserting holes 42, 52 and screwed with the assembling portion 91 of the cable-guiding pipe 90, so that the cables C can be inserted through the inserting members 60 and into the cable-guiding pipe 90, and the cables C would be restricted in the cable-guiding pipe 90 and prevented from swaying. The cable-guiding pipe 90 can be positioned in different angles or positions based on the manner in which the cables are arranged. For example, the cables of the rear wheel include brake and shift cables, and the brake and shift cables are inserted to the horizontal upper frame pipe and the slanting lower frame pipe, respectively. In this case, the cable-guiding pipe 90 can be disposed in an inclined manner toward the upper and lower frame pipe to provide a better guiding and restricting of the cables.

Figure 6:
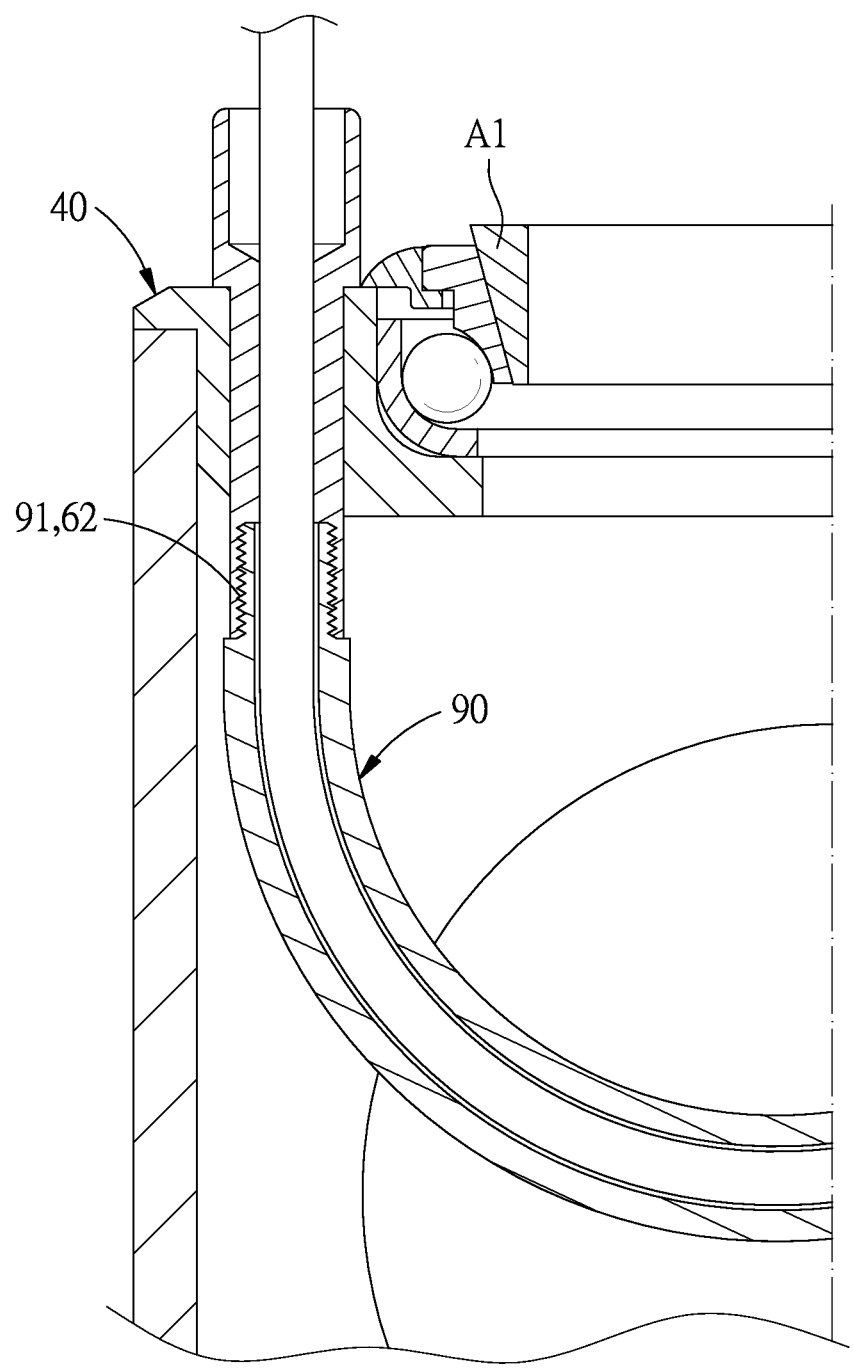
FIG. 6 is an enlarged view of a part of a head parts assembly for a bicycle in accordance with a second preferred embodiment of the present invention.

Referring then to FIG. 6, a head parts assembly for a bicycle in accordance with a second preferred embodiment of the present invention is similar to the first embodiment, except that the pipe-inserting holes 41, 51 of the bowls are provided with no inserting portion 421, 521, the connecting portion 62 is an inner thread, and the assembling portion 91 is an outer thread.

Figure 7:
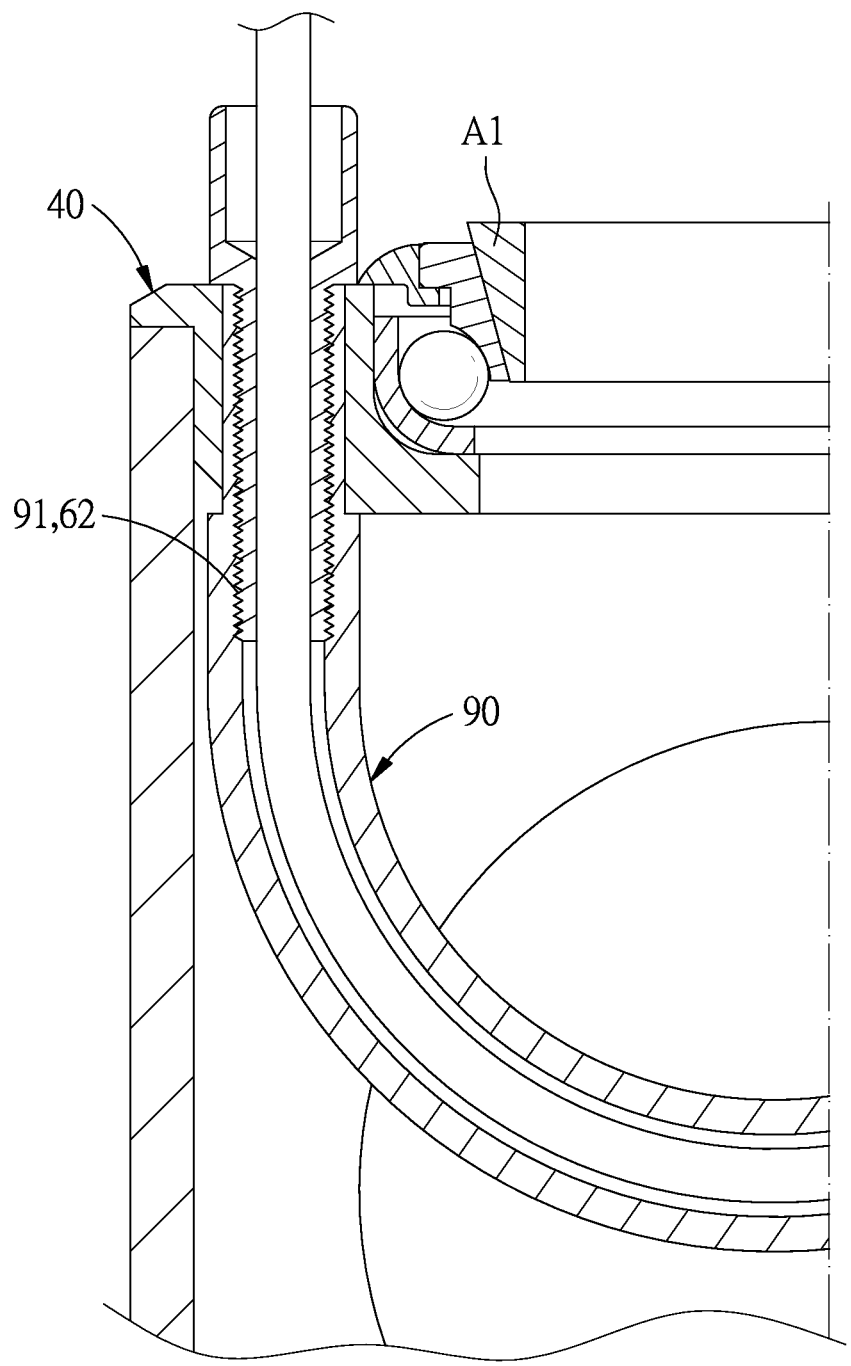
FIG. 7 is an enlarged view of a part of a head parts assembly for a bicycle in accordance with a third preferred embodiment of the present invention.

Referring then to FIG. 7, a head parts assembly for a bicycle in accordance with a third preferred embodiment of the present invention is similar to the first embodiment, except that the pipe-inserting holes 41, 51 of the bowls are provided with no inserting portion 421, 521, the assembling portion 91 is an inner thread and inserted through the pipe-inserting holes 41, 51, and the connecting portion 62 is an outer thread for meshing with the assembling portion 91.

In general, with the head parts assembly of the present invention enables the cables of the bicycles to be distributed without breaking the integrity of the front frame pipe 30, so that neither the aesthetic appearance nor the structural strength of the bicycle frame would be affected.

While we have shown and described various embodiments in accordance with the present invention, it is clear to those skilled in the art that further embodiments may be made without departing from the scope of the present invention.

What is claimed is:

1. A head parts assembly for a bicycle being disposed on a front frame pipe, and comprising:
   two bowls each being a circular structure and including a pipe-inserting hole, and a plurality of cable-inserting holes around the pipe-inserting hole, each of the bowls further including a receiving cavity in communication with the pipe-inserting holes, and each of the receiving cavities including an open end and a close end, the two bowls being disposed at two ends of the front frame pipe;
   a plurality of inserting members each being a hollow tubular structure with a cable hole for insertion of cables of the bicycle, the inserting members being screwed in the cable-inserting holes;
   two bead nests each being an annular structure rotatably disposed in the receiving cavities of the bowls and abutted against the close ends, respectively, each of the bead nests being provided with a plurality of balls; and
   two end caps being an annular structure disposed in the open ends of the receiving cavities, and capable of rotating by abutting against the balls of the bead nests.

2. The head parts assembly for the bicycle as claimed in claim 1, wherein the front frame pipe includes an upper connecting end and a lower connecting end, the two bowls are an upper bowl and a lower bowl, around the pipe-inserting holes of the upper and lower bowls are formed a plurality of cable-inserting holes, the upper bowl is disposed at the upper connecting end, and the lower bowl is disposed at the lower connecting end.

3. The head parts assembly for the bicycle as claimed in claim 1, wherein each of the pipe-inserting hole includes an inserting portion which is an inner thread, and a connecting portion is formed at one end of each of the inserting members and is an outer thread for engaging with the inserting portion.

4. The head parts assembly for the bicycle as claimed in claim 1, wherein the upper and lower bowls each are provided at one end thereof with an abutting flange, the receiving cavities are formed in the abutting flanges, and the abutting flanges are abutted against the front frame pipe.

5. The head parts assembly for the bicycle as claimed in claim 1, wherein the upper and lower bowls each are provided at one end thereof with an abutting flange, the receiving cavities are formed in the abutting flanges, and the abutting flanges are abutted against the front frame pipe, the two end caps each include a dustproof member and an end cover, the dustproof members are an annular structure disposed in the open ends of the receiving cavities and each have an abutting edge abutted against the abutting flanges, the end covers are also an annular structure disposed in the dustproof members, and have an arc-shaped edge abutted against the balls of the bead nests, so that the end covers is able to rotate by abutting against the balls of the bead nests.

6. The head parts assembly for the bicycle as claimed in claim 1, wherein each of the pipe-inserting hole includes an inserting portion which is an inner thread, and a connecting portion is formed at one end of each of the inserting members and is an outer thread for engaging with the inserting portion, a cable-guiding pipe with an assembling portion is disposed in the front frame pipe and connected to the cable-inserting holes, the assembling portion is an inner thread, the inserting members are inserted through the cable-inserting holes and screwed with the assembling portion of the cable-guiding pipe.

7. The head parts assembly for the bicycle as claimed in claim 1, wherein a connecting portion which is an inner thread is formed at one end of each of the inserting members, a cable-guiding pipe with an assembling portion is disposed in the front frame pipe and connected to the cable-inserting holes, the assembling portion is an outer thread for engaging with the connecting portion, the inserting members are inserted through the cable-inserting holes and screwed with the assembling portion of the cable-guiding pipe.

8. The head parts assembly for the bicycle as claimed in claim 1, wherein a connecting portion which is an outer thread is formed at one end of each of the inserting members, a cable-guiding pipe with an assembling portion is disposed in the front frame pipe and connected to the cable-inserting holes, the assembling portion is an inner thread for engaging with the connecting portion, the inserting members are inserted through the cable-inserting holes and screwed with the assembling portion of the cable-guiding pipe.

\* \* \* \* \*